(12) United States Patent
Reynolds et al.

(10) Patent No.: US 6,187,182 B1
(45) Date of Patent: *Feb. 13, 2001

(54) FILTER CARTRIDGE ASSEMBLY FOR A GAS PURGING SYSTEM

(75) Inventors: Gerald D. Reynolds, Hollister, CA (US); Gary M. Gallagher, Monument, CO (US); John Burns; Mark V. Smith, both of Colorado Springs, CO (US)

(73) Assignee: Semifab Incorporated, Hollister, CA (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/127,278

(22) Filed: Jul. 31, 1998

(51) Int. Cl.[7] .................................... B01D 51/00
(52) U.S. Cl. ................. 210/136; 210/429; 210/430; 210/431; 210/450; 137/541; 137/543.17
(58) Field of Search .................... 210/429, 431, 210/430, 450, 136; 137/541, 543.17

(56) References Cited

U.S. PATENT DOCUMENTS 4,129,145 * 12/1978 Wynn .
5,634,880 * 6/1997 Feldman et al. .
5,792,425 * 8/1998 Clarke et al. .
5,807,238    9/1998 Feldman et al. .
5,810,062 * 9/1998 Bonora et al. .
5,846,338 * 12/1998 Bonora et al. .
5,879,458 * 3/1999 Roberson, Jr. et al. .

FOREIGN PATENT DOCUMENTS

| 32 33 268 A1 | 8/1984 | (DE) . |
| 0 735 573 A1 | 2/1996 | (EP) . |
| 42 36 031 C2 | 11/1996 | (GB) . |
| WO 93/01434 | 1/1993 | (WO) . |

* cited by examiner

Primary Examiner—W. L. Walker
Assistant Examiner—Michael A. Fleming
(74) Attorney, Agent, or Firm—Fulwider Patton Lee & Utecht, LLP

(57) ABSTRACT

The filter cartridge assembly has a valve body having an interior flow passage, a filter across the interior flow passage, and a check valve assembly in the valve body. The filter removes particulates as small as 0.003 microns. A check valve element adjacent to a valve seat in the interior flow passage has a check valve poppet and a stem. The check valve poppet has a relatively narrow neck, and the check valve poppet is tapered inwardly from the outlet end toward the neck at an oblique angle relative to the longitudinal axis of the valve body that is substantially equal to the oblique angle of the annular valve seat.

9 Claims, 3 Drawing Sheets

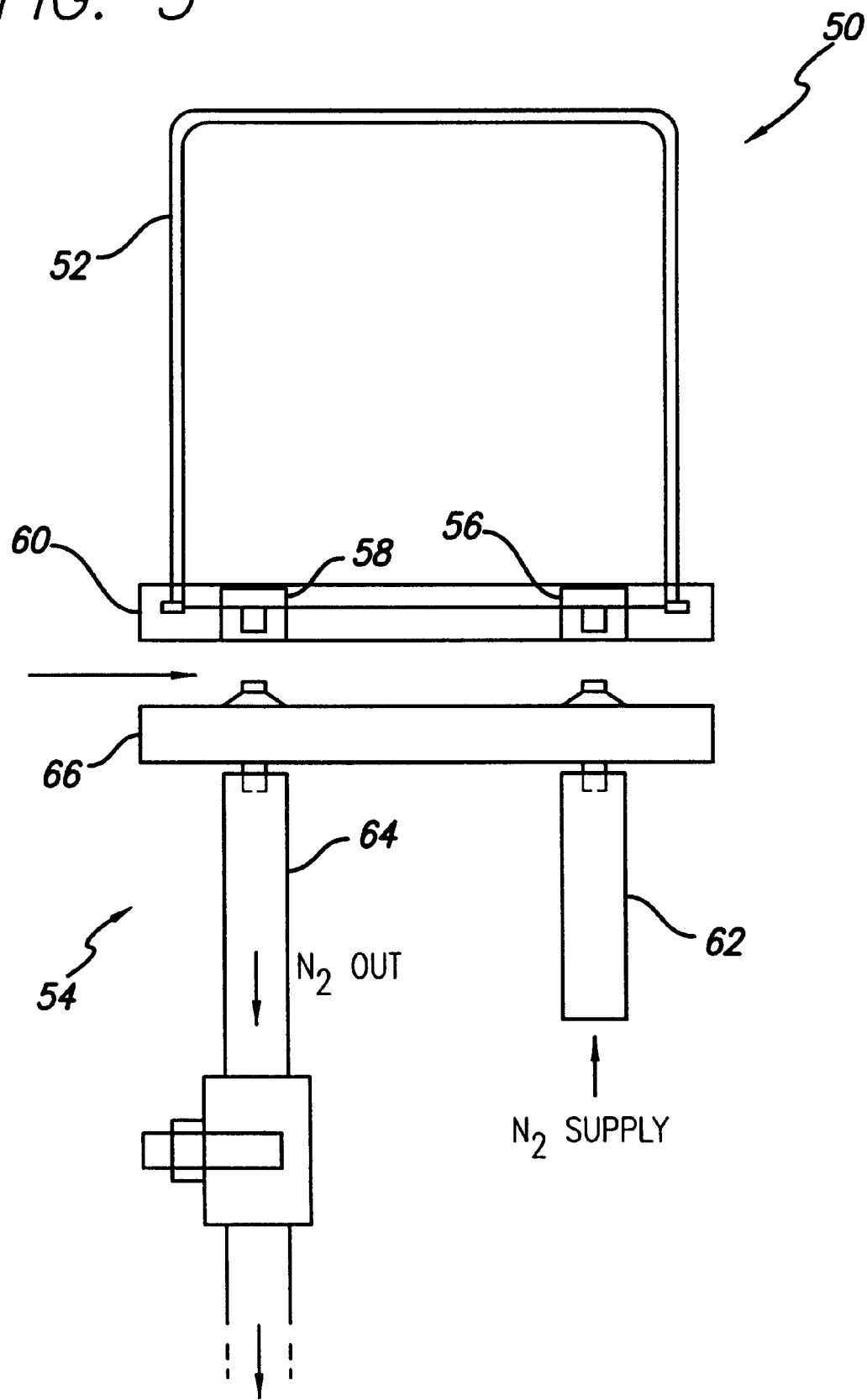

FILTER CARTRIDGE ASSEMBLY FOR A GAS PURGING SYSTEM

BACKGROUND OF THE INVENTION

1. Field of the Invention

This invention relates generally to filter cartridge assemblies, and more particularly relates to a filter cartridge assembly for a gas purging system.

2. Description of Related Art

A modular isolation chamber such as a standard mechanical interface (SMIF) box, or pod, can be of various sizes and configurations, but typically provides a microenvironment to isolate and control the environment surrounding a wafer, cassette of wafers or substrates used in manufacturing integrated circuits, during storage, transport and processing of the materials. Processing of such materials traditionally has been carried out in a particulate free environment generally known as a "clean room". However, maintenance of such "clean rooms" in a contaminant free state can require a great deal of care and effort, particularly during processing of the materials.

In one conventional system in which a SMIF system is used to replace a traditional clean room, filtered air is circulated in the SMIF box, and still air is used to achieve cleanliness in the SMIF box. Purge systems are also known in which manufacturing materials are subjected to cold nitrogen purge cycles. Another conventional method and apparatus for cleaning integrated circuit wafers utilizes dry gases. There remains a need for a filter cartridge assembly for SMIF pods that can be readily removed and replaced from the SMIF pods on a regular basis or as needed, to consistently protect the SMIF pods from gas leakage into the SMIF pods, such as through check valves during handling of the SMIF pods such as in a fabrication facility, to maintain desired levels of particulates within the SMIF pods. The present invention meets these needs.

SUMMARY OF THE INVENTION

Briefly, and in general terms, the present invention provides for a filter cartridge assembly for use in a SMIF pod to help to insure that only a clean, gaseous working fluid enters the SMIF pod, to provide a controlled environment around the contents of the SMIF pod with a very low particulate content.

The invention accordingly provides for a filter cartridge assembly comprising a valve body having an interior flow passage with an inlet end and an outlet end, a filter element disposed in the valve body across the interior flow passage, and a valve seat defined in the interior flow passage. The filter element comprises a filter media that preferably removes particulates as small as 0.003 microns at an efficiency of about 99.9999%.

A valve element such as a check valve element is disposed in the interior flow passage adjacent to the valve seat. The check valve element has a check valve poppet and a stem, with the poppet being oriented toward the outlet end and the stem being oriented toward the inlet end. The valve seat has an annular seating surface that is tapered inwardly toward the inlet end at an oblique angle relative to the longitudinal axis of the valve body. The check valve poppet has an outer diameter that is less than the inner diameter of the valve seat, and a relatively narrow neck with an inner diameter that is less than the outer diameter of the check valve poppet. The surface of the check valve poppet is also preferably tapered inwardly from the outlet end of the check valve poppet toward the neck at an oblique angle relative to the longitudinal axis of the valve body that is substantially equal to the oblique angle of the annular seating surface. A spring is disposed between a flange on the stem upstream of the seating surface and an interior shoulder facing the filter cartridge inlet end and upstream of the seating surface to bias the check valve element toward the inlet end of the valve body to close the flow passage. A deformable resilient O-ring is also disposed on the narrow neck of the check valve poppet, and the outer diameter of the O-ring is preferably greater than the inner diameter of the annular seating surface of the valve seat. Alternatively, other types of valve elements, such as a butterfly-type valve, may also be suitable.

These and other aspects and advantages of the invention will become apparent from the following detailed description and the accompanying drawings, which illustrate by way of example the features of the invention.

BRIEF DESCRIPTION OF THE DRAWINGS

FIG. 5 is a partial sectional view of a SMIF pod incorporating the filter cartridge assembly of the invention, schematically illustrating the mounting of the SMIF pod for filtering of a gaseous working fluid flow through the SMIF pod.

DETAILED DESCRIPTION OF THE PREFERRED EMBODIMENTS

While filtered gas or air can be circulated in a standard mechanical interface box to purge contaminants from the box, the filters of such containers need to be easily and readily changeable, either regularly or as needed, to prevent gas leakage into the SMIF pods to preserve desired levels of particulates in the containers.

Figure 1:
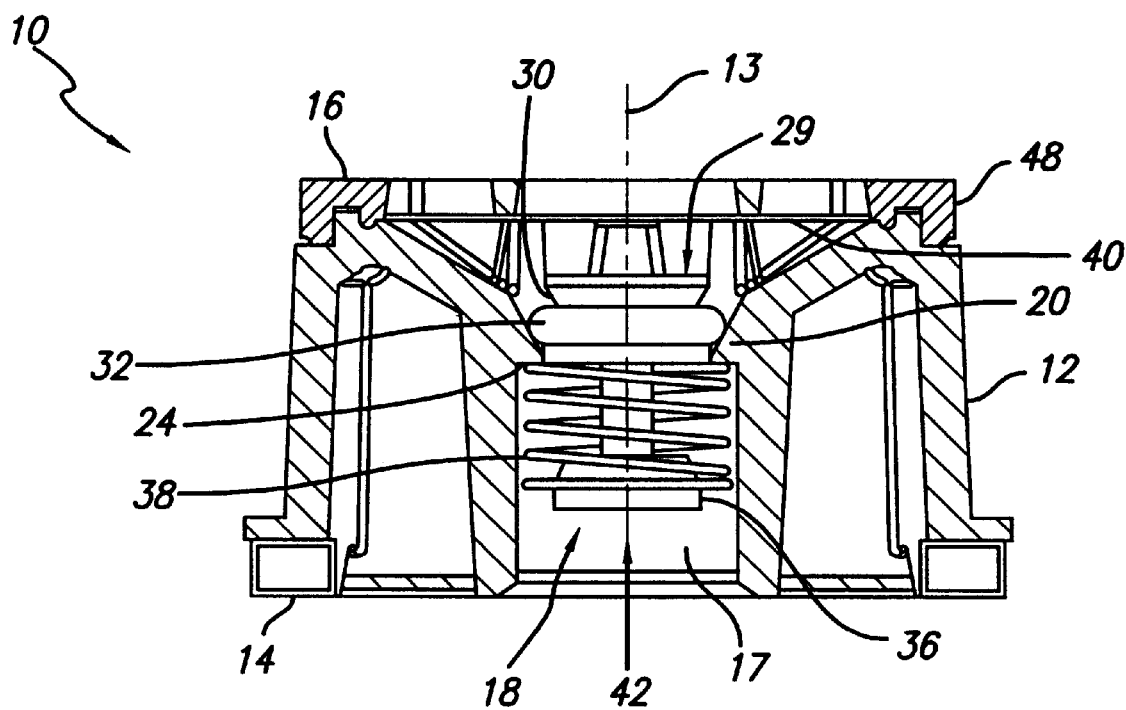
FIG. 1 is a cross-sectional elevational view of the filter cartridge assembly of the invention.
Figure 2:
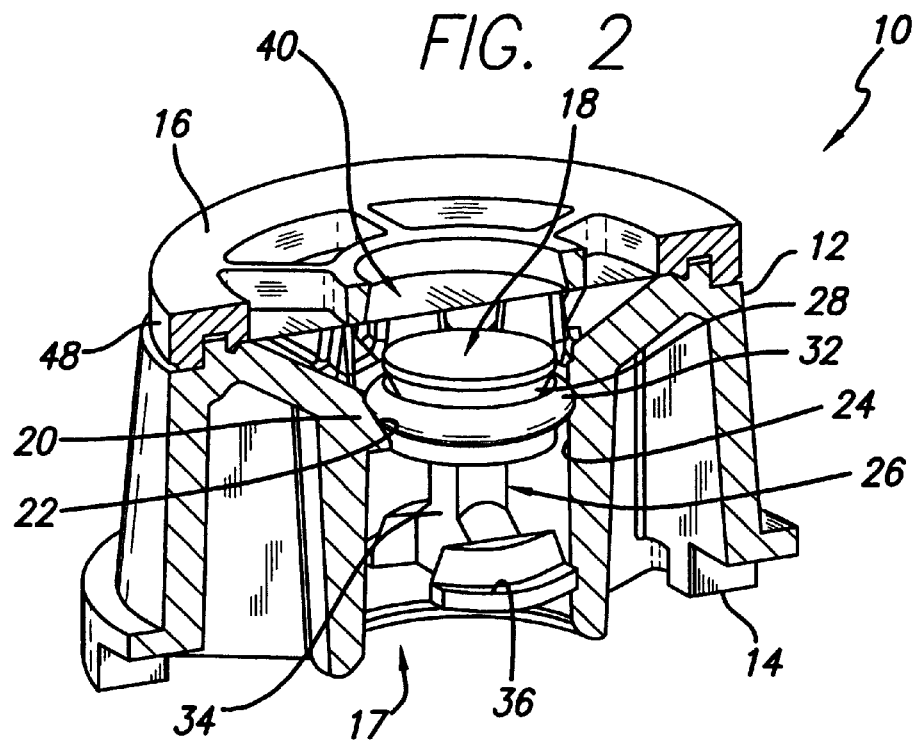
FIG. 2 is a perspective, sectional view of the filter cartridge assembly of FIG. 1.
Figure 3:
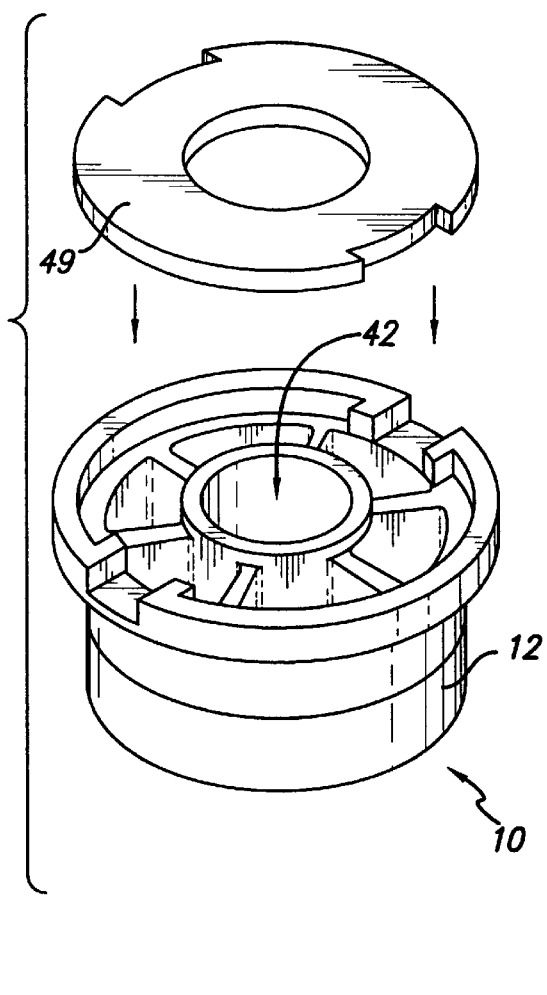
FIG. 3 is an exploded view of the bottom side of the filter cartridge assembly of FIG. 1.
Figure 4:
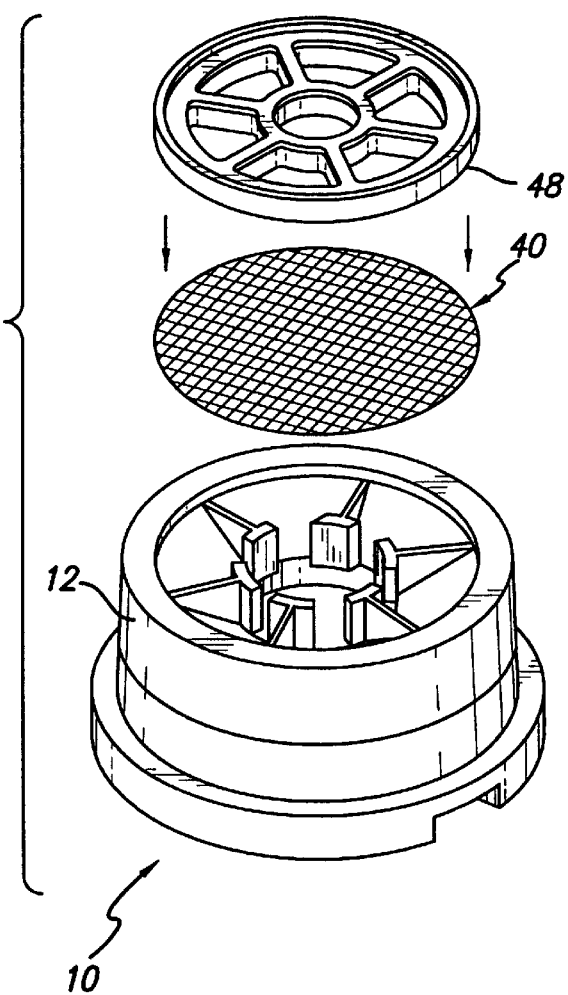
FIG. 4 is an exploded view of the top of the filter cartridge assembly of FIG. 1.

As is illustrated in the drawings, the invention is accordingly embodied in a filter cartridge assembly for consistently protecting the SMIF pods from gas leakage into the SMIF pods, such as through check valves during handling of the SMIF pods such as in a fabrication facility, to maintain desired levels of particulates within the SMIF pods. Referring to FIGS. 1 to 4, the invention provides for a filter cartridge assembly 10 having a housing or body 12 with a longitudinal axis 13, an inlet end 14, an outlet end 16, and an interior flow passage 17 formed in the body extending from the inlet end to the outlet end. In one presently preferred embodiment, the body is formed of polycarbonate plastic. The filter cartridge assembly includes a valve element such as a check valve 18 within the interior flow passage allowing one-way flow of a gaseous working fluid from the inlet end to the outlet end. The integral directional flow check valve is preferably activated at very low pressure differentials, typically less than 10 millibar. A valve seat 20 is defined by the interior surface of the interior flow passage, and includes a seating surface 22 facing the outlet end. The seating surface is preferably tapered inwardly toward the inlet end at an oblique angle relative to the longitudinal axis of the valve body. A shoulder 24 is preferably formed in the interior flow passage adjacent to and upstream of the valve seat facing toward the inlet end. Alternatively, other types of valve elements, such as a butterfly-type valve, for example, may also be suitable.

A check valve element 26 is disposed in the interior flow passage, and includes a frustoconical poppet 28 at an outlet end 29 of the check valve element. The poppet preferably has an outer diameter that is less than the inner diameter of the valve seat, and has a surface defining a relatively narrow neck 30 having an inner diameter that is less than the outer diameter of the check valve poppet. The surface of the check valve poppet is tapered inwardly from the outlet end of the check valve poppet toward the neck at an oblique angle relative to the longitudinal axis of the valve body that is substantially equal to the oblique angle of the annular seating surface. A deformable, resilient O-ring 32 is preferably disposed over the relatively narrow neck of the check valve poppet, and the outer diameter of the O-ring is preferably greater than the inner diameter of the annular seating surface of the valve seat.

The check valve element has a check valve stem 34 at the upstream end of the check valve element, with preferably one or more flanges 36 extending from the upstream end of the stem, providing a seating surface for a coiled spring 38 disposed between the flanges and the shoulder 24, to bias the check valve element toward the inlet end of the valve body toward a closed position closing the flow passage.

A filter element 40 is provided in the interior flow passage, and in one presently preferred embodiment is provided at the outlet end of the filter cartridge assembly to remove particulate matter from a gaseous working fluid passing through the interior flow passage in the direction of flow 42. In a presently preferred embodiment, the filter element comprises a filter media bonded by ultrasonic welding using a perimeter weld technique to a support structure such as a retaining ring or weld ring 48, and removes particulates as small as 0.003 microns at an efficiency of about 99.9999%. The bonding of the filter media to the perimeter weld ring forms a permanent perimeter bond preventing gas from escaping between the filter media and the support structure. A presently preferred filter media is available under the trade name "WAFERGARD" from Millipore of Bedford, Mass. In a presently preferred embodiment, the filter element is secured to the body of the filter cartridge assembly by the retaining ring 48 that is configured to snap to the body of the filter cartridge assembly to secure the filter element in place, for easy access to changing of the filter element for periodic maintenance. Alternatively, for example, the retaining ring can be threadedly secured to the body of the filter cartridge assembly. The filter element can be replaced, for example, to increase or decrease filtration based on desired flow rates, and desired particle removal. At the opposing end of the filter cartridge assembly, a cap seal 49 can be snapped snugly in place on the body of the filter cartridge assembly to present a smooth exterior surface to the clean room.

Referring to FIG. 5, a standard mechanical interface (SMIF) box, or pod 50 having a housing 52, is adapted to be mounted for operation in combination with a molecular contamination control base unit indicated generally as 54, providing a source of gaseous working fluid, such as nitrogen gas, argon gas, or other similar inert gas or combination of gases, at a pressure of about 3–15 psi, for example, in fluid communication with the SMIF pod for purging the SMIF pod. Currently, nitrogen gas is preferred.

In a presently preferred embodiment of the invention, filter cartridge assemblies are incorporated into inlet port 56 and outlet port 58 in gasketless taper locks fitting the filter cartridge assemblies in the base 60 of the SMIF pod. The inlet port of the SMIF pod base is adapted to be connected in fluid communication with a supply or feed line 62, and the outlet port of the SMIF pod base is adapted to be connected in fluid communication with an exhaust or outlet line 64, respectively, of a base plate 66 of the molecular contamination control base unit.

It has thus been demonstrated that the filter cartridge assembly of the invention can be utilized for purging a contaminant free environment such as a SMIF pod, and can be readily removed and replaced, to allow desired levels of particulates to be consistently maintained in the contaminant free environment.

It will be apparent from the foregoing that while particular forms of the invention have been illustrated and described, various modifications can be made without departing from the spirit and scope of the invention. Accordingly, it is not intended that the invention be limited, except as by the appended claims.

What is claimed is:

1. A filter cartridge assembly comprising:

first and second filter cartridges mounted in a base of a modular isolation chamber, said modular isolation chamber having an inlet port and an outlet port, said first filter cartridge mounted in said inlet port and adapted to permit one-way flow into the modular isolation chamber, and said second filter cartridge mounted in said outlet port and adapted to permit one-way flow out of the modular isolation chamber; and wherein each filter cartridge comprises:

a valve body having a longitudinal axis, an inlet end and an outlet end, the valve body having an interior flow passage with a surface defining valve seat having an annular seating surface;

a filter element disposed in the valve body across the interior flow passage;

a check valve element disposed in the interior flow passage adjacent to the valve seat, the check valve element including a check valve poppet and a stem, said poppet being oriented toward the outlet end, said poppet having an outer diameter that is less than the inner diameter of the valve seat, and having a relatively narrow neck with an inner diameter that is less than the outer diameter of the check valve poppet, and said stem being oriented toward the inlet end and extending through a portion of the interior flow passage;

a deformable resilient O-ring disposed on the narrow neck of the check valve poppet, said O-ring having an outer diameter that is greater than the inner diameter of the annular seating surface of the valve seat; and wherein said filter cartridge assembly further comprises a base plate having a supply and an outer line, said supply adapted to be connected to said first filter cartridge, and said outlet line adapted to be connected to said second filter cartridge, whereby said supply line and said outlet line of said base plate can be connected to said first and second filter cartridges, respectively, to provide a one way purging flow of gas through said modular isolation chamber.

2. The filter cartridge assembly of claim 1, wherein said annular seating surface is tapered inwardly toward the inlet end at an oblique angle relative to the longitudinal axis of the valve body.

3. The filter cartridge assembly of claim 1, wherein said filter element comprises a filter media bonded to a support structure.

4. The filter cartridge assembly of claim 3, wherein said filter media removes particulates as small as 0.003 microns.

5. The filter cartridge assembly of claim 1, wherein said stem has a flange upstream of the seating surface, the flow passage has a surface defining an interior shoulder upstream of the seating surface, and a spring is disposed between said flange and said interior shoulder to bias the check valve element toward the inlet end of the valve body to close the flow passage.

6. The filter cartridge assembly of claim 2, wherein said check valve poppet has a surface that is tapered inwardly from the outlet end of the check valve poppet toward the neck at an oblique angle relative to the longitudinal axis of the valve body that is substantially equal to the oblique angle of the annular seating surface.

7. The filter cartridge assembly of claim 3, wherein said support structure is configured to snap to the valve body to secure the filter element in place.

8. The filter cartridge assembly of claim 7, wherein the filter element can be replaced to modify filtration based on desired flow rates, and desired particle removal.

9. The filter cartridge assembly of claim 1, wherein said filter cartridge assembly is adapted to be fitted to a pod by a gasketless taper lock.

* * * * *

UNITED STATES PATENT AND TRADEMARK OFFICE
CERTIFICATE OF CORRECTION

PATENT NO. : 6,187,182B1 Page 1 of 1
DATED : February 13, 2001
INVENTOR(S) : Gerald D. Reynolds, et al.

It is certified that error appears in the above-identified patent and that said Letters Patent is hereby corrected as shown below:

<u>Title page,</u>
Under "Assignee", after "(US)", add the following:
-- and EMPAK, Colorado Springs, CO (US), both with 50% interests.--.

Signed and Sealed this

Nineteenth Day of June, 2001

*Attest:*

*Attesting Officer*

NICHOLAS P. GODICI
*Acting Director of the United States Patent and Trademark Office*